April 25, 1967  H. V. MARTIN, JR  3,315,887
NAVIGATION AID

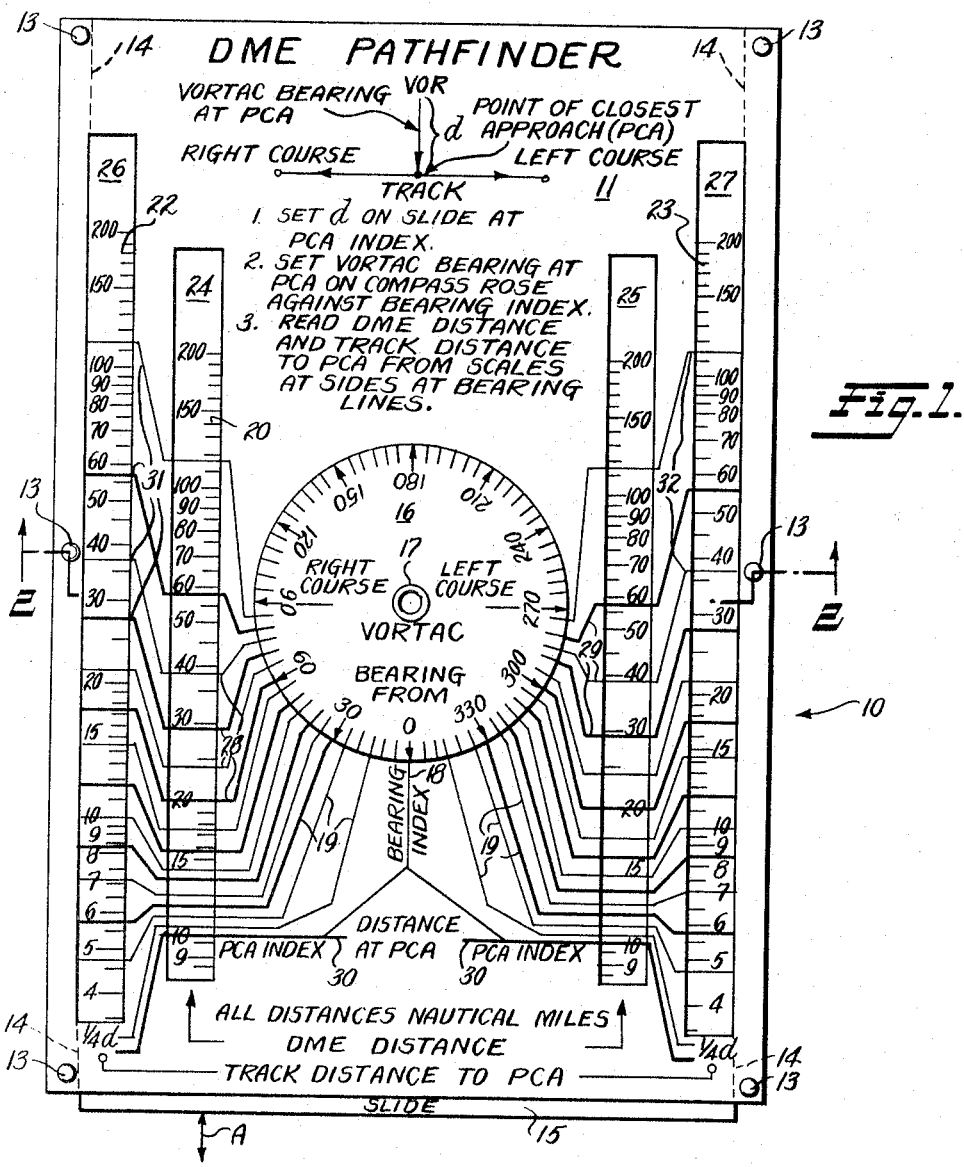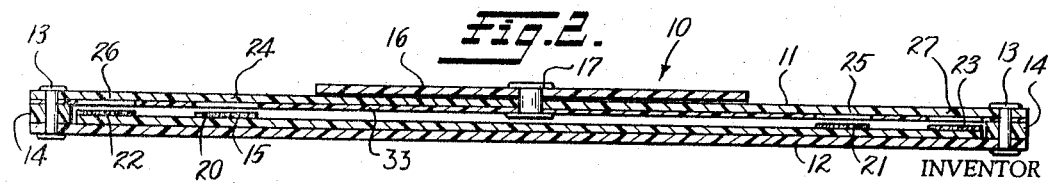

Filed Aug. 27, 1965  2 Sheets-Sheet 2

INVENTOR
HUNT V. MARTIN, JR.

United States Patent Office 3,315,887
Patented Apr. 25, 1967

3,315,887
NAVIGATION AID
Hunt V. Martin, Jr., Springfield, Va., assignor to Marko, a partnership consisting of Hunt V. Martin, Jr., and Arnold G. Gulko
Filed Aug. 27, 1965, Ser. No. 483,093
11 Claims. (Cl. 235—61)

The present invention relates to a calculating device or computer useful as an aid to navigation to facilitate direct flight utilizing distance and bearing information from a VORTAC station.

In accordance with present practice, OMNI apparatus is used so that a pilot may fly from a point of origin to a destination by flying first to a VORTAC station along the way and then from the VORTAC station to the destination. Since it frequently occurs that the VORTAC station closest to the desired track is situated a distance of from 10–30 miles away from the track, the flight path actually traveled is not a direct route, adding an average of 10–15% to the travel distance and time.

As is well known, the term VOR identifies very high frequency omnirange equipment, both ground based and aircraft installed, which is used for aerial navigation. The term OMNI is used interchangeably with VOR to identify the same equipment. This equipment enables the aircraft to obtain its bearing from or direction to a ground station irrespective of the heading of the aircraft. The term VORTAC is used to identify a very high frequency omnirange ground station which has associated with it at least a part of the TACAN (tactical air navigation) system, that part being the distance measuring portion. With this equipment, the aircraft can obtain both bearing and distance from the ground station if the aircraft is equipped with distance measuring equipment (termed DME).

In addition to OMNI apparatus, DME apparatus is also available, this DME apparatus indicating the distance to the VORTAC station in nautical miles. Such DME equipment is available on some aircraft and is useful in enabling the pilot to rapidly plot his actual position by noting both the bearing from the VORTAC station and his distance from it.

The desirability of being able to fly directly from any point of origin to any destination even when there is no VORTAC station directly in the desired path and utilizing OMNI bearings and DME distances is a matter of considerable interest as illustrated particularly by the article entitled "Straight-Line Navigation With DME" appearing in the June 1965 issue of The AOPA Pilot, Vol. 8, No. 6 at page 56. The system of navigation there proposed represents a considerable burden as is evidenced from the assessment published at page 62 of the same publication where it is stated:

"If you don't mind some rather extensive preflight planning, the straight-line system will shorten most of your trips and can be flown as accurately as any other form of navigation."

The present invention permits the straight-line system to be used, utilizing a preflight planning which, with the aid of the computer discussed more fully hereinafter, enables continuous information to indicate the correct DME distance which should be encountered at any bearing from the VORTAC station. In this way, if the actual distances exceed the calculated distance, one need merely head slightly more toward the station and, correspondingly, if the actual values are lower than the calculated values, one need merely turn slightly away from the station.

As will be evident, the fact that the correct heading for any desired course may be found by simply flying an approximately correct heading and then correcting in flight provides, to some considerable degree, a capacity to completely eliminate preliminary calculation of deviation, variation, and wind drift. Of course, it would be better to utilize preliminary calculation in order that the initial chosen heading will be as close to correct as possible, but it is not essential nor does it have the importance that it would as when dead reckoning in relied upon.

A further advantage of the invention is the simplification of the planning operation to the point where it can be done within the confines of the limited cockpit activity available to the pilot. In this way, and particularly under emergency conditions, one would be able to rapidly plot a direct course to a desired destination under actual cockpit conditions in mid flight, an emergency capacity of considerable advantage.

In accordance with the invention, a navigation aid is provided for use with OMNI apparatus which provides bearings with respect to an OMNI station and DME apparatus giving distances with respect to the same station. The navigation aid is a computer which can be referred to generally as a slide chart and which comprises three separate information-containing surface as follows:

(1) A first surface having a scale which indicates the bearings of a compass and which is normally and most conveniently illustrated by the conventional compass rose;

(2) A second surface having a bearing index marked thereon, the first surface being movable with respect to the second so that the compass rose may be rotated to bring any desired bearing into alignment with the index; and (3) A third surface movable with respect to the second and having at least logarithmic distance scale thereon.

The second surface is lined to provide a logarithmic trigonometric scale connected to the bearings on the compass rose so that any bearing on either side of the bearing index may be traced to a corresponding portion of the trigonometric scale which, in turn, is positioned alongside of the logarithmic distance scale so that when the third surface is moved to a desired position, particular bearings will be correlated with particular distances.

In this way, and once the navigation aid has been set to align the bearing at the point of closest approach on the compass rose with the bearing index and to align the distance between the station and the desired course with the index of the trigonometric scale, the aid provides a continuous readout of the distance to the station for any bearing from the station.

As will be evident, if the actual distance shown by the DME indicator exceeds the calculated value, the pilot is drifting away from the station and he must turn slightly towards the station to correct. Conversely, if the actual distance shown by the DME indicator is less than the calculated value, the pilot is drifting toward the station and he must turn slightly away from the station to correct. If the actual and calculated distances coincide, then the heading is correct to maintain the desired course.

The invention will be more fully understood from a description of a preferred form thereof which is shown in the accompanying drawings in which:

FIG. 1 is a plan view of a preferred navigation aid constructed in accordance with the invention in assembled condition and set to solve a particular navigation problem;

FIG. 2 is a section taken on the line 2—2 of FIG. 1 and showing the manner in which the navigation aid is constructed;

Figure 3:
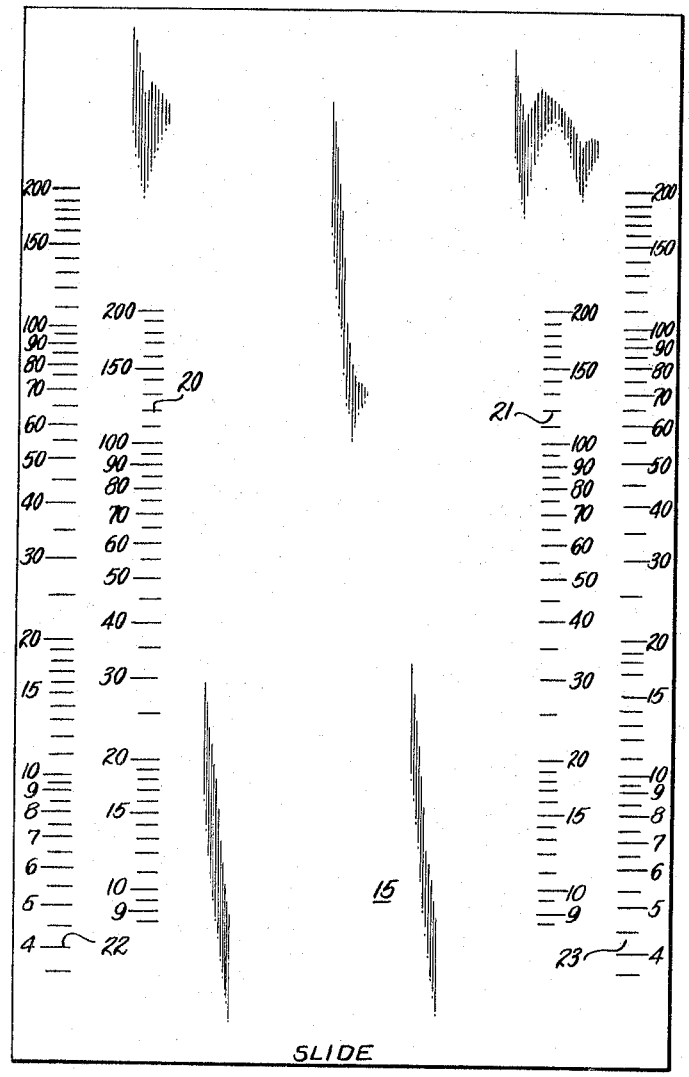
FIG. 3 is a plan view showing the slide portion of the navigation aid.

Referring to FIGS. 1 and 2, the navigation aid 10 is formed of an upper sheet 11 and a lower sheet 12 which are secured together at their lateral margins by means of rivets 13. The rivets 13 extend through the upper and lower sheets 11 and 12 and also through marginal spacing strips 14 which serve to space the sheets 11 and 12 to facilitate the longitudinal sliding movement of slide 15 therebetween. The aid 10 further includes a compass rose 16 which is rotatably secured to the upper sheet 11 by means of a grommet 17.

As will be evident, the compass rose 16 can be rotated with respect to the upper sheet 11 and the slide 15 and, in turn, the slide 15 can be adjusted longitudinally of the upper sheet 11 as desired.

The compass rose 16 is of conventional structure marked at its outer periphery to show the bearings for as many of the 360 degrees of the compass as is convenient.

The upper face of upper sheet 11 is marked to include a bearing index 18 against which the compass rose can be set using the bearing from the VORTAC station at the point of closest approach. The upper surface of sheet 11 is also provided with marks 19 on either side of the index to interconnect bearings on the compass rose with certain logarithmic distance scales 20, 21, 22 and 23 which are carried by the slide 15 and which are visible through windows 24, 25, 26 and 27 in the upper sheet 11. These windows are formed by an opaque coating 33 which is omitted in the window areas. Obviously, one could use cut-out windows as well.

The marks 19 terminate adjacent the windows 24 and 25 in logarithmic secant scales 28 and 29 so that, when the distance to the VORTAC station at the point of closest approach is set by moving slide 15 to cause this distance to underlie the PCA index 30 which is connected to the bearing index 18 on the upper surface of sheet 11, then the distance scales 20 and 21 automatically multiply the distance from the point of closest approach by the secant of the angle formed between the actual bearing and the bearing at the point of closest approach so that, at any actual bearing, the appropriate mark 19 terminates in a line of a secant scale which is aligned with the distance to the VORTAC station for that bearing.

Similarly, the marks 19 continue past the distance scales 20 and 21 and terminate again in logarithmic tangent scales 31 and 32 which enable any bearing to be correlated with the distance scales 22 or 23 to automatically multiply the distance from the point of closest approach by the tangent of the angle formed between the actual bearing and the bearing at the point of closest approach so that, at any actual bearing, the appropriate mark 19 can be followed to the appropriate line of tangent scale 31 or 32 which is aligned with the distance along the track to the point of closest approach for that bearing.

Figure 4:
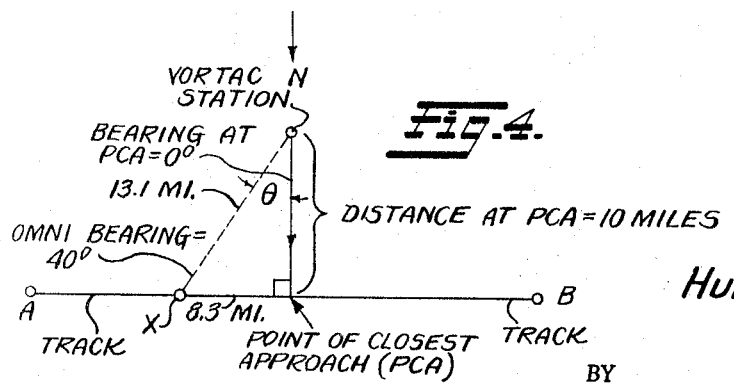
FIG. 4 illustrates a typical navigation problem which the structure shown in FIG. 1 is set to handle.

The angle referred to above is identified as the angle in FIG. 4.

Referring more particularly to FIG. 1, the double ended arrow A indicates the longitudinal sliding movement of slide 15 used to position distance scales 20 or 21 against PCA index 30. The bulk of sheet 11 is opaque except for windows 24, 25, 26 and 27 so that the bulk of slide 15 is not visible. Slide 15 is shown in full in FIG. 3.

It will be observed that distance scales 20 and 21 go down to about 8½ nautical miles. When the VORTAC station is less than this distance from the track, there is little need for the invention. Similarly, the distance scales 22 and 23 go down to about 3½ nautical miles because accuracy is lost. Tangent scales 31 and 32 estimate a zero value and a value approximately ¼d (¼ the distance between the VORTAC station and the point of closest approach).

The outer faces of sheets 11 and 12 may also include informational materials, representative information being illustrated on the upper face of sheet 11 in FIG. 1.

FIG. 4 illustrates a portion of a map on which one intends to fly a course from point A to point B, the course being identified as the track. The VORTAC station is shown and a perpendicular line has been dropped from the VORTAC station to the track. This perpendicular line has a bearing which can be measured from the map and it also has a distance which can be measured in nautical miles from the scale on the map. The contact between the perpendicular line and the track occurs at the point of closest approach and it is the distance and the bearing contact point of closest approach which are set on the navigation aid before the aid is used.

Referring again to FIG. 1, the navigational problem posed in FIG. 4 has been used to adjust the aid and the aid in FIG. 1 is shown in its adjusted position. Thus, the compass rose 16 has been set so that the bearing at the point of closest approach shown to be 0 degrees in FIG. 4 is set in FIG. 1 against the bearing index 18. Also, it will be noted that slide 15 has been moved so that the distance at the point of closest approach shown to be 10 miles in FIG. 4 is set against the PCA index. More particularly, the 10 mile value on distance scale 20 is aligned with the PCA index 30.

The navigation aid of the invention is now ready for use and we will assume that the pilot has progressed from point A down the track to a point marked X. By taking a bearing from point X on the VORTAC station, he obtains a bearing of 40°. Referring to FIG. 1, one can follow the line 19 associated with a bearing of 40° on compass rose 16 to a value of approximately 13.1 on distance scale 20. By continuing along the same line outwardly to tangent scale 31, one can read a track distance from the point X to the point of closest approach of approximately 8.3.

These calculated values are only approximated since one can only read the bearings and the scale values as best one is able. However, the approximation is reasonably accurate and one can compare this with the DME distance indicator on the aircraft and know immediately whether one is too close or too far from the VORTAC station used. Similarly, one can gauge his approximate progress along the track.

It is desired to point out that the navigational aid according to the invention is primarily intended to provide a continuous read out enabling the pilot to check whether his actual distance from the OMNI station corresponds with the distance which can be calculated based on the assumption that one has followed a preselected track or course. At the same time, and this has been discussed with respect to the drawings, it is a convenience to also read out the distance which one has traveled along the track toward or away from the point on the track which most closely approaches the station involved.

On the other hand, and when a DME distance indicator is not available, the navigation aid of the invention can nonetheless serve many important purposes. First, one can assume that one is following the correct track and the device of the invention permits one to calculate his distance along the track which is helpful to prepare the pilot to use other information regarding his course, e.g., landmarks useful in dead reckoning.

Further, and particularly when two of the navigation aids of the invention are used, each aid being set for the bearing and distance at the point of closest approach with respect to a different OMNI station, one can calculate (using bearings on each of two stations) the distance along the track to the point of closest approach for each station. If one is actually following the predetermined track, then the respective distances will differ (with due regard for whether distances should be regarded as positive or negative) by the distance between the respective points of closest approach along the track.

Stated differently, and regarding the track distances on the near side of the calculator as positive and the track distance on the far side of the calculator as negative (near and far are determined by the direction one is flying), then the addition of the track distance between the points of closest approach and the track distance to the nearest OMNI station should provide a total which equals the track distance to the point of closest approach of the furthest OMNI.

If the distances do not substantially correspond as aforesaid, then one is off course, and appropriate correction must be made.

It should also be noted that the DME distance scales can be eliminated entirely and the slide 15 can be set from the bearing marker 45° removed from the bearing index. Referring again to the problem illustrated in FIG. 4, and to the aid in FIG. 1, it will be seen that the 45° bearing marker 19 can be followed to the 10 mile value on distance scale 22 enabling the slide 15 to be set in proper position without reliance upon the DME distance scales 20 or 21.

The utilization of the navigation aid of the invention in the absence of DME equipment is not as simple or as advantageous as in the case when DME equipment is available, but a useful navigation aid is nonetheless provided.

The invention is defined in the claims which follow.

I claim:

1. A navigation aid for use with OMNI apparatus giving bearings with respect to an OMNI station and DME apparatus giving distances with respect to the same station, comprising three separate information-containing surfaces as follows:
   (1) a first surface provided by a compass rose rotatable about its axis with respect to the other two surfaces;
   (2) a second surface fixed with respect to the axis of said compass rose and having a bearing index marked thereon; and
   (3) a third surface slidably longitudinally with respect to said second surface and having at least one pair of logarithmic distance scales thereon, said scales being disposed on opposite sides of said compass rose;
said second surface being lined to provide a pair of longarithmic secant scales connected to the bearings on said compass rose, one of said secant scales being positioned on each side of said bearing index, said logarithmic secant scales being positioned alongside said logarithmic distance scales on said third surface so that when the bearing from the point of closest approach to said station is aligned with said bearing index and the distance from the point of closest approach to said station is aligned with the unit index of said secant scale, the bearings on said compass rose on each side of said bearing index will become correlated with particular distances on each of said distance scales indicative of the DME distance which correspond with the selected course.

2. A navigation aid for use with OMNI apparatus giving bearings with respect to an OMNI station and DME apparatus giving distances with respect to the same station, comprising three separate information-containing surfaces as follows:
   (1) a first surface provided by a compass rose rotatable about its axis with respect to the other two surfaces;
   (2) a second surface fixed with respect to the axis of said compass rose and having a bearing index marked thereon; and
   (3) a third surface slidably movable with respect to said second surface and having two pairs of parallel logarithmic distance scales thereon, said distance scales being disposed on opposite sides of said compass rose so that one scale of each of said pairs of scales is disposed on opposite sides of said compass rose;
said second surface being lined to provide a pair of logarithmic trigonometric scales parallel to one another and connected to the bearings on said compass rose, one of said trigonometric scales being positioned on each side of said bearing index, said logarithmic trigonometric scales being positioned alongside of said logarithmic distance scales on said third surface so that movement of said third surface will correlate particular bearings on each side of said bearing index with particular distances on each of said distance scales.

3. A device as recited in claim 2 in which said pairs of logarithmic distance scales are correlated with said bearing index by said logarithmic trigonometric scales such that one pair of said pairs of distance scales is correlated by means of the trigonometric secant function and the other by means of the trigonometric tangent function.

4. A device as recited in claim 3 in which said logarithmic distance scales of each of said pair of distance scales have the same dimensions.

5. A device as recited in claim 2 in which said second surface overlies said third surface and is provided with windows through which said logarithmic distance scales of said third surface may be seen.

6. A device as recited in claim 2 in which said compass rose is mounted atop said second surface and said second surface is formed to slidably carry said third surface.

7. A navigation aid for use with OMNI apparatus giving bearings with respect to an OMNI station comprising three separte information-containing surfaces as follows:
   (1) a first surface provided by a compass rose rotatable about its axis with respect to the other two surfaces;
   (2) a second surface fixed with respect to the axis of said compass rose and having a bearing index marked thereon; and
   (3) a third surface slidable longitudinally with respect to said second surface and having a plurality of logarithmic distance scales thereon including at least one pair of parallel logarithmic distance scales, said parallel scales being disposed on opposite sides of said compass rose;
said second surface being lined to provide at least one logarithmic secant scale and a pair of logarithmic tangent scales connected to the bearings on said compass rose, one of said tangent scales being positioned on each side of said bearing index, said logarithmic tangent scales being positioned alongside said pair of logarithmic distance scales on said third surface so that when the bearing from the point of closest approach to said station is aligned with said bearing index and the distance from the point of closest approach to said station is aligned with the unit index of said secant scale, the bearings on said compass rose on each side of said bearing index will become correlated via said tangent scales with particular distances on each of said pair of distance scales indicative of the distance along the selected course from the point on said course which most closely approaches said station.

8. A navigation aid for use with OMNI apparatus giving bearings with respect to an OMNI station comprising three separate information-containing surfaces as follows:
   (1) a first surface provided by a compass rose rotatable about its axis with respect to the other two surfaces;
   (2) a second surface fixed with respect to the axis of said compass rose; and
   (3) a third surface slidable with respect to said second surface and having at least one logarithmic distance scale thereon;
said second surface being lined to provide at least one logarithmic tangent scale positioned alongside said logarithmic distance scale, and markings interconnecting the bearings on said compass rose with said tangent scale.

9. A navigation aid for use with OMNI apparatus giving bearings with respect to an OMNI station comprising three separate information-containing surfaces as follows:
  (1) a first surface provided by a compass rose rotatable about its axis with respect to the other two surfaces;
  (2) a second surface fixed with respect to the axis of said compass rose; and
  (3) a third surface slidable with respect to said second surface and having at least two parallel logarithmic distance scales thereon; said second surface being lined to provide at least one logarithmic tangent scale positioned alongside one of said logarithmic distance scales, and at least one logarithmic secant scale positioned alongside the other of said logarithmic distance scales, and markings correlating the bearings on said compass rose with said tangent scale and said secant scale.

10. A navigation aid as recited in claim 9 in which said second surface includes a bearing index for said compass rose marked thereon with markings correlating the bearings on said compass rose on each side of said bearing index with said tangent scale and said secant scale.

11. A navigation aid as recited in claim 10 in which said logarithmic distance scales each have the same dimensions and in which said second surface underlies said third surface and is provided with windows through which said logarithmic distance scales of said third surface may be seen, said compass rose being mounted atop said second surface with said second surface being formed to slidably carry said third surface.

References Cited by the Examiner

UNITED STATES PATENTS

| | | | |
|---|---|---|---|
| 7,961 | 4/1851 | Nystrom | 235—61 |
| 771,663 | 10/1904 | Percy. | |
| 2,661,900 | 12/1953 | Pastorius | 235—74 |
| 2,823,857 | 2/1958 | Heitor | 235—61 |
| 3,193,195 | 7/1965 | Jeffries | 235—61 |

OTHER REFERENCES

Jenkins, A. L., "Design of Special Slide Rules II," December 1917, pp. 384–388.

RICHARD B. WILKINSON, *Primary Examiner.*

W. F. BAUER, *Assistant Examiner.*